United States Patent
Schaffert et al.

(10) Patent No.: US 9,326,438 B2
(45) Date of Patent: May 3, 2016

(54) TRASH DEFLECTOR

(75) Inventors: Paul E. Schaffert, Indianola, NE (US);
Doug Shadley, Indianola, NE (US);
Ashley Nicole Jackson, legal representative, Clinton, OK (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 102 days.

(21) Appl. No.: 13/333,356

(22) Filed: Dec. 21, 2011

(65) Prior Publication Data

US 2012/0291681 A1 Nov. 22, 2012

Related U.S. Application Data

(60) Provisional application No. 61/425,645, filed on Dec. 21, 2010, provisional application No. 61/436,085, filed on Jan. 25, 2011.

(51) Int. Cl.
| | |
|---|---|
| *A01C 7/06* | (2006.01) |
| *A01C 15/00* | (2006.01) |
| *A01C 23/02* | (2006.01) |
| *A01C 23/04* | (2006.01) |
| *A01B 23/06* | (2006.01) |
| *A01B 25/00* | (2006.01) |
| *A01B 49/06* | (2006.01) |

(52) U.S. Cl.
CPC ............ *A01B 23/06* (2013.01); *A01B 25/00* (2013.01); *A01B 49/06* (2013.01); *A01C 7/06* (2013.01); *A01C 15/008* (2013.01); *A01C 23/025* (2013.01); *A01C 23/047* (2013.01)

(58) Field of Classification Search
CPC ........ A01C 7/06; A01C 15/00; A01C 15/008;
A01C 23/00; A01C 23/005; A01C 23/006;
A01C 23/008; A01C 23/02; A01C 23/021;
A01C 23/022; A01C 23/023; A01C 23/024;
A01C 23/025; A01C 23/026; A01C 23/04;
A01C 23/047; A01B 15/16; A01B 15/18;
A01B 23/06; A01B 25/00; A01B 33/00;
A01B 33/16; A01B 49/04; A01B 49/06;
A01B 71/08; A01B 71/00; A01B 79/02;
B60S 1/68; B60S 1/66; B60S 1/62; B60S 1/00
USPC ................. 111/118–129, 139–143, 157, 159, 111/163–170, 174, 186–193, 200; 172/776, 172/684.5, 606, 610, 558–566, 547, 172/508–518, 81, 39
See application file for complete search history.

(56) References Cited

U.S. PATENT DOCUMENTS

| | | | | |
|---|---|---|---|---|
| 3,666,572 | A * | 5/1972 | Nakagawa et al. | 148/595 |
| 6,283,050 | B1 * | 9/2001 | Schaffert | 111/150 |
| 2007/0278272 | A1 * | 12/2007 | Fast | 224/410 |
| 2008/0303238 | A1 * | 12/2008 | Fichter | 280/163 |
| 2009/0000796 | A1 | 1/2009 | Cooper et al. | |
| 2009/0235853 | A1 | 9/2009 | Schaffert | |

* cited by examiner

*Primary Examiner* — Christopher J Novosad
(74) *Attorney, Agent, or Firm* — Dorsey & Whitney LLP

(57) ABSTRACT

An attachment assembly for the disc of a mobile agricultural device, including a washer configured to attach to a disc of the mobile agricultural device. The washer may be attached to a center location of the disc. The washer is operatively connected to a deflector bar. The deflector bar substantially prevents debris from accumulating between the disc and a fertilizer assembly attached to the disc, as the disc rotates. The deflector bar in other embodiments, may be directly connected to a fertilizer assembly, rather than to the washer.

14 Claims, 13 Drawing Sheets

TRASH DEFLECTOR

FIELD

The present invention relates to agricultural seed planters, drills and fertilizers. More specifically, the present invention relates to the wheels/discs of seed planters, drills and fertilizer apparatuses.

BACKGROUND

Agricultural seed planting is typically accomplished by multi-row planters. Each planter includes a plurality of row units adapted for opening a seed furrow, depositing seeds within the furrow, and closing the seed furrow around the seeds. In some cases, each row unit of the planter will also open a fertilizer furrow adjacent to each seed furrow, deposit liquid fertilizer in each fertilizer furrow, and close each fertilizer furrow.

As the wheel or disc of the planter/fertilizer travels along the planting area, the wheel or disc collects debris from the area, for example, root balls, cobbs, stalks, etc. This debris (also referred to as "trash") interferes with the rotation of the wheel and/or discs. In some instances, the debris may even completely stop rotation of the wheel and/or disc, such that the wheel is dragged, in other instances, the wheel/disc may rotate unevenly. If the wheel/disc is prevented from rotating, or is otherwise rotated unevenly, the seed placement and/or liquid fertilization distribution is adversely affected. For example, the wheel/disc may be prevented from adequately opening furrows, or may not open the furrows deep enough. Additionally, as the rotation may be affected, uneven seed placement results in some seeds being placed too deep or too shallow within the furrow, also uneven seed placement may result in some seeds being offset from the row. If a seed is offset from the predetermined row it may not receive fertilizer or water, and may be trampled by people or equipment if it is able to germinate. Similarly, if the liquid fertilizer is offset and is unevenly distributed, some seeds may not receive any fertilizer and may not germinate and others may receive too much fertilizer and may die.

SUMMARY

Disclosed herein is a trash deflector to be used with a mobile agricultural device. In one embodiment, a disc attachment bar is configured to attach to a disc of the mobile agricultural device. The disc attachment bar is operatively attached to a deflector bar and a fertilizer bar. The fertilizer bar is configured to deposit fertilizer into a furrow created by the disc. The deflector bar is configured to reduce or prevent debris from accumulating on the disc as it is rotated upwards and towards a top portion of the fertilizer bar.

In other embodiments, the attachment assembly includes a retainer configured to attach to a disc of an agricultural planter. A deflector bar is operatively attached to the retainer, the deflector bar may be angled upwards towards a top portion of the disc. The deflector bar is configured to reduce or prevent debris from accumulating on the disc as the disc rotates.

Still other embodiments may include an agricultural planter having a hitch bar configured to attach to a tractor. The hitch bar may include at least one wheel for supporting the hitch as it is pulled by the tractor, where the at least one wheel is located at a bottom portion of the hitch bar. The hitch bar also may include at least one disc for creating a furrow, the disc is located at a bottom portion of the hitch bar adjacent to the at least one wheel. Also, a trash deflector assembly is operatively connected to the disc, and there may be a trash deflector assembly for each of the disc(s). The trash deflector assembly is configured to substantially prevent debris from traveling along a complete rotation of the disc.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Disclosed herein is a debris or trash deflector for use with agricultural mobile devices, such as planters, rippers, coulters, drills and the like. In some embodiments, the trash deflector has a deflector bar and an attachment location. The attachment location may be secured to a bracket assembly supporting a fertilizer tube on a fertilizer disc. In other embodiments, the trash deflector may be attached to a planter, seed hopper, fertilizer tank or the like, and extend over and downwards around the disc. As a tractor (or other device) pulls the fertilizer assembly (or other assembly, e.g., a drill assembly, ripper, coulter, etc.), the disc turns and as debris is picked up and attaches to the disc, the trash deflector displaces the debris or otherwise knocks the pieces off of the disc.

In other embodiments, the trash deflector may be configured to be installed on planting assemblies that may not have an attached fertilizer assembly. In these embodiments, the trash deflector may include a deflector bar and a retainer. The deflector bar is secured to the retainer and the retainer may be installed on a wheel or disc of a planting assembly. For example, in some embodiments the retainer is located at a center portion of the wheel around a bolt or screw used to secure the wheel to the planting assembly. As the planting assembly is pulled or towed across the planting area, the deflector bar knocks off debris and other trash that accumulates on the wheel. Accordingly, while the several embodiments of a trash deflector shown and described herein may be shown in conjunction with a fertilizer disc, the trash deflector may also be used in conjunction with furrow opening discs or other wheels or ground engaging portions of a planter or other implement.

Figure 1:
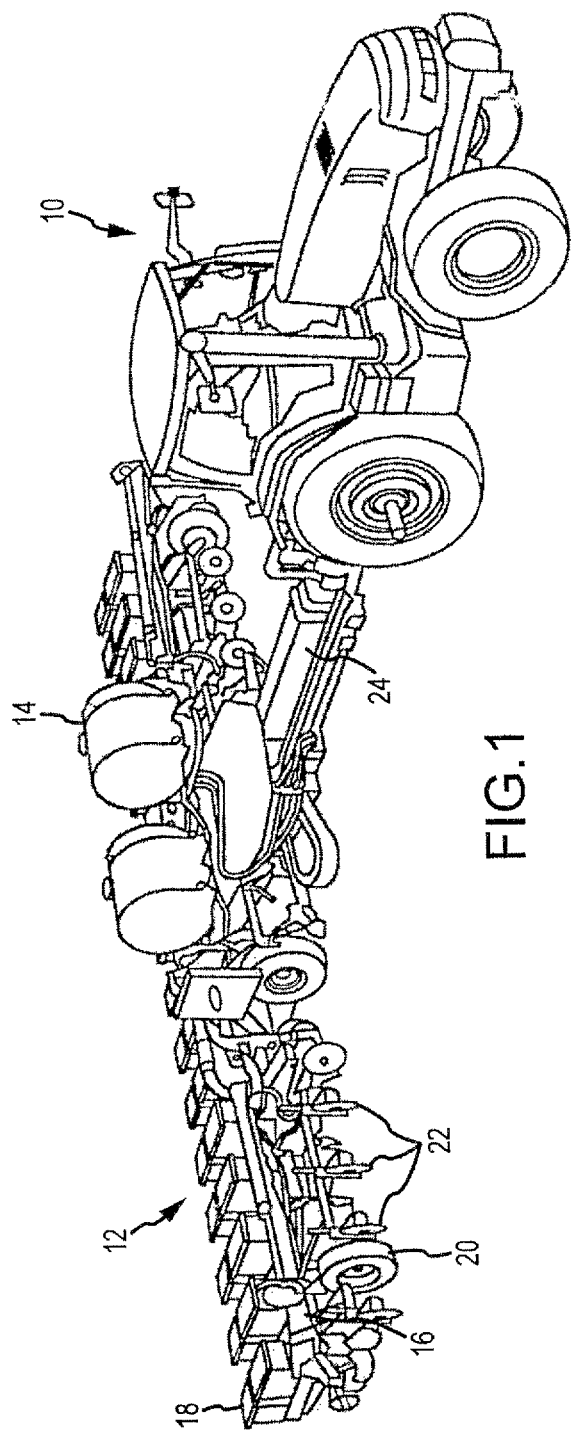
FIG. 1 is an isometric view of a tractor pulling a seed planter.

FIG. 1 illustrates a tractor pulling a planting and fertilizing assembly. The tractor 10 is attached via a hitch bar 24 to a planter 12. The planter 12 includes wheels 20 for supporting and rolling the planter 12, as well as discs 22 used to create the seed furrows, fertilizer furrows, or perform other ground modifications, for example. It is noted here that the term disc may include furrow opening discs as well as fertilizer discs as mentioned above. The discs 22 may create a seed furrow or a fertilizer furrow as the tractor 10 pulls the planter 12 along the field. For example, the discs 22 in some embodiments create a generally V-shaped furrow in the ground and in other embodiments, the discs create a slot or slit in the ground. In some embodiments, the planter 12 may include a seed hopper 18 for storing the seeds before they are deposited into the furrow. Additionally, the planter 12 may also include fertilizer storage 14 for storing the fertilizer before it is deposited within or adjacent to the furrow.

Figure 2:
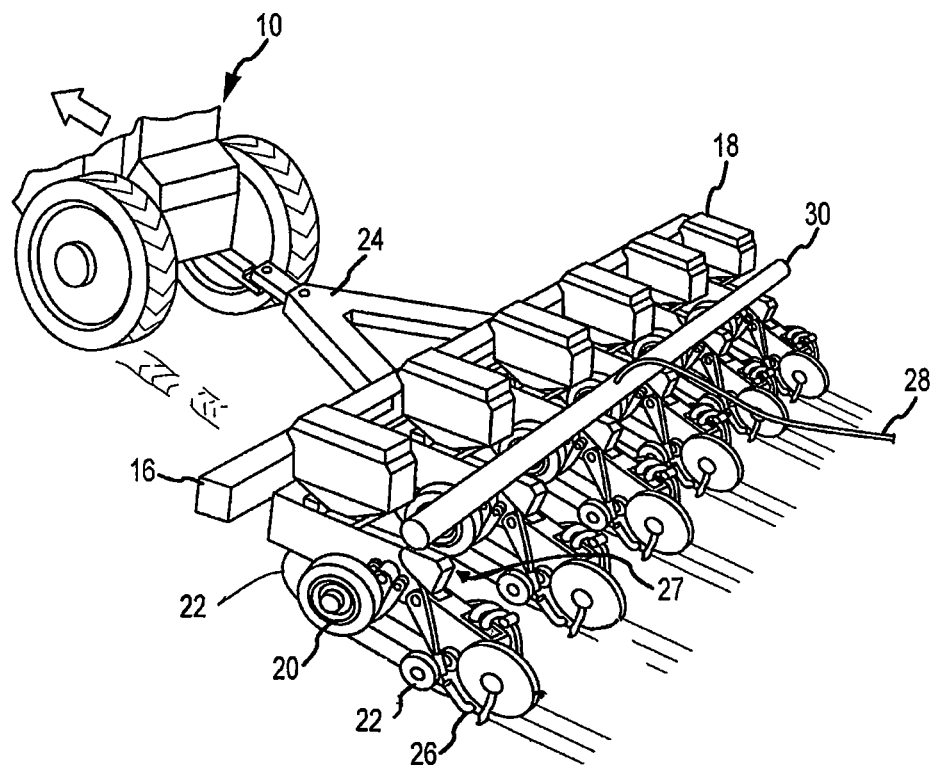
FIG. 2 is top rear isometric view of the planter including an embodiment of the trash deflector.

FIG. 2 illustrates an enlarged view of one embodiment of the planter 12. In this embodiment the planter 12 includes a depositing assembly 27. While generally hidden from view in FIG. 2, the depositing assembly 27 may be used to deposit seeds within a furrow. In some embodiments, the depositing assembly 27 may be a rebounder, seed tube, etc. The depositing assembly 27 receives seeds from the seed hopper 18 located on the planter 12. The depositing assembly 27 then deposits each seed in its respective furrow.

The planter 12 may also include a fertilizer tube 26, a fertilizer bar 30 and a fertilizer hose 28. The fertilizer hose 28 is fluidly connected to the fertilizer storage tanks 14 and a pump (not illustrated). The pump pumps fertilizer from the tanks 14 to the fertilizer bar 30 via the fertilizer hose 28. The fertilizer bar 30 provides fertilizer to each fertilizer tube 26, which then deposits the fertilizer into or near the seed furrow as the tractor 10 pulls the planter 12 assembly. The fertilizer may be deposited after or at the same time as the seed is deposited in the furrow. In some embodiments, and particularly in the case of the disc 22 being a fertilizer disc, the fertilizer tube 26 may be aligned along the discs 22.

The discs 22 may be provided with a trash deflector 42. The trash deflector 42 may be attached to each disc 22 and may include a deflector bar 48. It should be noted that although the discs 22 are illustrated as being part of a tractor-pulled fertilizing assembly that the discs 22 may be a part of any other movable device with wheels. For instance, a coulter, ripper, or the like. Similarly, although the trash deflector 42 is illustrated as being used with a disc 22 for a planting/fertilizing assembly, the trash deflector 42 may be used with any wheel, disc or rotating device that collects debris along its surfaces, e.g., a lawn mower, bicycle, or the like.

The deflector bar 48 prevents debris, such as sticks, cobbs, stalks, etc. from continually sticking and attaching to the discs 22. For example, as the tractor 10 pulls the planter assembly 12 debris laying the in field or portions of soil may accumulate on the discs 22. However, as the discs 22 rotate (as they are pulled across the field), the trash that attaches to the discs 22 reaches the deflector bar 48. Once the debris reaches the deflector bar 48, the deflector bar 48 effectively scrapes or shears off the trash from the discs 22 as the discs 22 move past the stationary deflector bar 48. This allows the disc 22 to rotate freely and evenly. The deflector bar 48 prevents or reduces the accumulation of debris along the disc 22.

Figure 3:
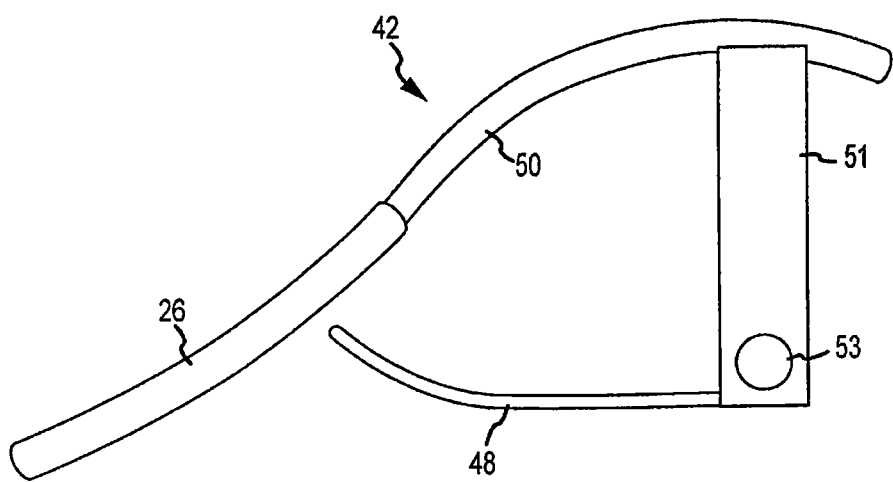
FIG. 3 is a side elevation view of a first embodiment of the trash deflector.
Figure 4:
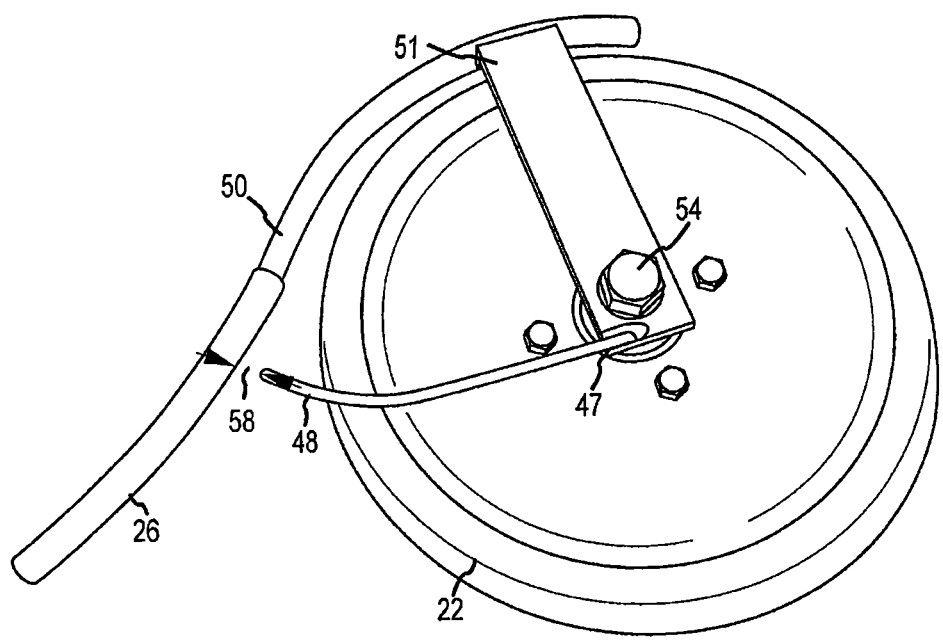
FIG. 4 is a side elevation view of the trash deflector illustrated in FIG. 3 installed on a disc.

FIG. 3 illustrates an embodiment of the trash deflector 42 and FIG. 4 illustrates the embodiment as shown in FIG. 3 installed on a disc 22. In these embodiments, the trash deflector 42 has a deflector bar 48 attached to the disc attachment bar 51. The disc attachment bar 51 attaches the trash deflector 42 to the disc 22 and also may be used to attach a fertilizer distributor bar 50 to the disc 22.

The disc attachment bar 51 may include a bolt aperture 53, which may be used to receive a center bolt 54 attaching the disc attachment bar 51 to the disc 22. The disc attachment bar 51, in some embodiments, may be constructed out of metal such as aluminum, steel, metal, alloys, etc. In other embodiments, the disc attachment bar 51 may be constructed out of plastic, ceramic or other sufficiently strong and durable materials.

The deflector bar 48 is used to deflect debris off of the disc 22 and back onto the ground. The deflector bar 48 may include a free end that is spaced a distance 58 away from the fertilizer distributor bar 50. This distance 58 should be close enough to prevent substantial amounts of debris from passing between the deflector bar 48 and the fertilizer distributor bar 50, while at the same time be sufficiently long to prevent the fertilizer bar 50 and the deflector bar 48 from touching. In some embodiments, the distance 58 may range from fractions of an inch to many inches, depending on the size of the disc 22, the type of trash collected, as well as the type of assembly attached to the disc 22. For example, the larger the debris, the farther away the deflector bar 48 may be spaced from the disc 22, while still shearing the debris from the disc 22.

As trash travels up along the disc 22 it will be deflected off of the disc 22 before reaching an area between the fertilizer distributor bar 50 and the disc 22 (and getting caught or otherwise trapped between the disc 22 and the distributor bar 50). The deflector bar 48 in some embodiments may be made out of stainless steel, however in other embodiments, the deflector bar 48 may be constructed out of plastic, oil tempered wire, abrasion resistant metals, alloys, ceramics, or the like.

The deflector bar 48 may be formed as a continuous construction with the disc attachment bar 51, or may be separately attached to the disc attachment bar 51. For example, in some embodiments, the deflector bar 48 may be welded to the disc attachment bar 51. In other embodiments, the deflector bar 48 may be molded or otherwise formed together as an integral piece. Similarly, the deflector bar 48 may be formed integrally with the fertilizer bar 50, or in other embodiments, the deflector bar 48 may be formed integrally with a fertilizing assembly, drill assembly, coulter assembly, and the like. Further, in some instances, the integral assembly may be constructed to deflect debris on a particular side of the disc 22 and/or wheels 20, i.e., there may be a right-side embodiment and a left-side embodiment.

Additionally, the deflector bar 48 may be slightly curved upwards towards the fertilizer bar 50. This may allow the deflector bar 48 to be secured at a lower position on the disc 22 and still be able to prevent debris from passing between the fertilizer bar 50 and the deflector 48. In some embodiments the deflector bar 48 may contact the disc 22, or may be spaced away from the disc 22. Additionally, the deflector bar 48 may be bent to be adjusted, allowing the deflector bar 48 to be customized (i.e. the distance 58 individually set) to each planter 22 or fertilizer bar 50 assembly. In some embodiments, the deflector bar 48 may be more readily bendable in a direction out of plane of the disc 22 and less readily bendable in the plane of the disc 22 such that lateral adjustment of the deflector bar 48 may be performed without exceeding difficulty and yet the deflector bar may maintain its vertical or radial position when force is applied by trash.

The fertilizer distributor bar 50 may be additionally connected to a fertilizer distributor tube 26. The fertilizer distributor bar 50 may be constructed out of a similar material to the disc attachment bar 51. For example, the fertilizer distributor bar 50 may be a metal such as steel or aluminum. The fertilizer distributor tube 26 on the other hand, may be made of a more flexible material than the fertilizer distributor bar 50. In these embodiments, the fertilizer distributor tube 26 may easily flex to enter the furrow and deposit fertilizer in or near the furrow. However, in some embodiments, the fertilizer distributor bar 50 may not include the tube 26, and may be shaped to adequately provide fertilizer to each furrow itself.

The center fastener 54 may also be used to attach the disc 22 to the planter 12, for example to a tow bar, trailing arm assembly, or other assembly used by the planter 12 to control the discs 22. The center fastener 54 in some embodiments is a metal bolt, or screw, however many other retaining and attachment mechanisms may be sufficient. For example, the disc 22 may be attached to the planter 12 with other methods.

The disc 22 may include a plain metal furrow disc. In some embodiments, a rubber layer surrounding a metal portion may be provided. In still other embodiments, the disc 22 may be constructed from any combination of materials or may be a single material.

Figure 11A:
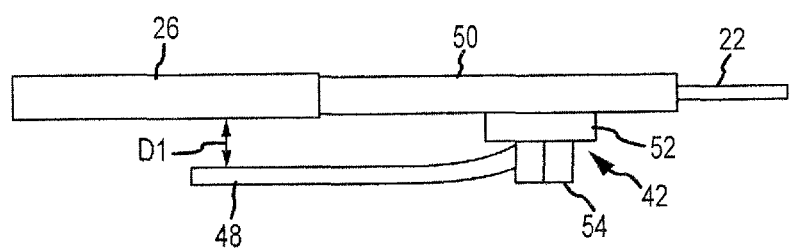
FIG. 11A illustrates a top elevation view of the disc and trash deflector shown in FIG. 4.
Figure 11B:
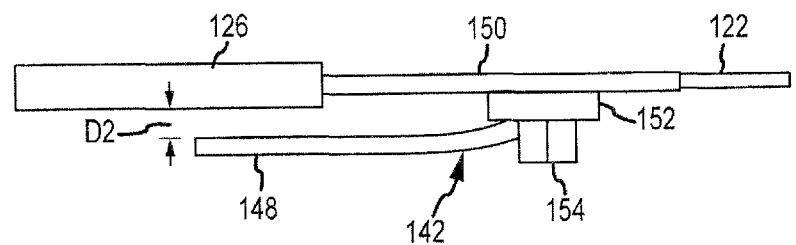
FIG. 11B illustrates a top elevation view of another example of a disc and trash deflector.

FIG. 11A illustrates a top elevation view of the disc 22 and trash deflector 42 shown in FIGS. 3 and 4. FIG. 11B illustrates a top elevation view of another example of a disc 122 and trash deflector 142. As shown in FIGS. 11A and 11B, the deflector 48, 148 may be positioned further or closer to the disc 22, 122 as desired by a user. For example, in FIG. 11A, the deflector 42 may be positioned such that it is sufficiently spaced apart from the disc 22 (at a distance D1) to prevent the deflector 42 from interfering with the rotation of the disc 22, but close enough to deflect debris from the disc 22. In another example, shown in FIG. 11B, the deflector 148 may be positioned closer to the disc 122, but still sufficiently far apart from the disc 122 (at a distance D2) so that it does not contact the disc 122. As shown in FIGS. 11A and 11B, in some examples, the deflector 48, 148 may be substantially parallel to the disc 22, 122. However, in other embodiments, the deflector may be curved or bent along its length so that it curves or bends toward or away from the disc. Additionally, in some embodiments, the deflector may be oriented at an angle with respect to the disc, rather than substantially parallel to the disc.

Figure 5:
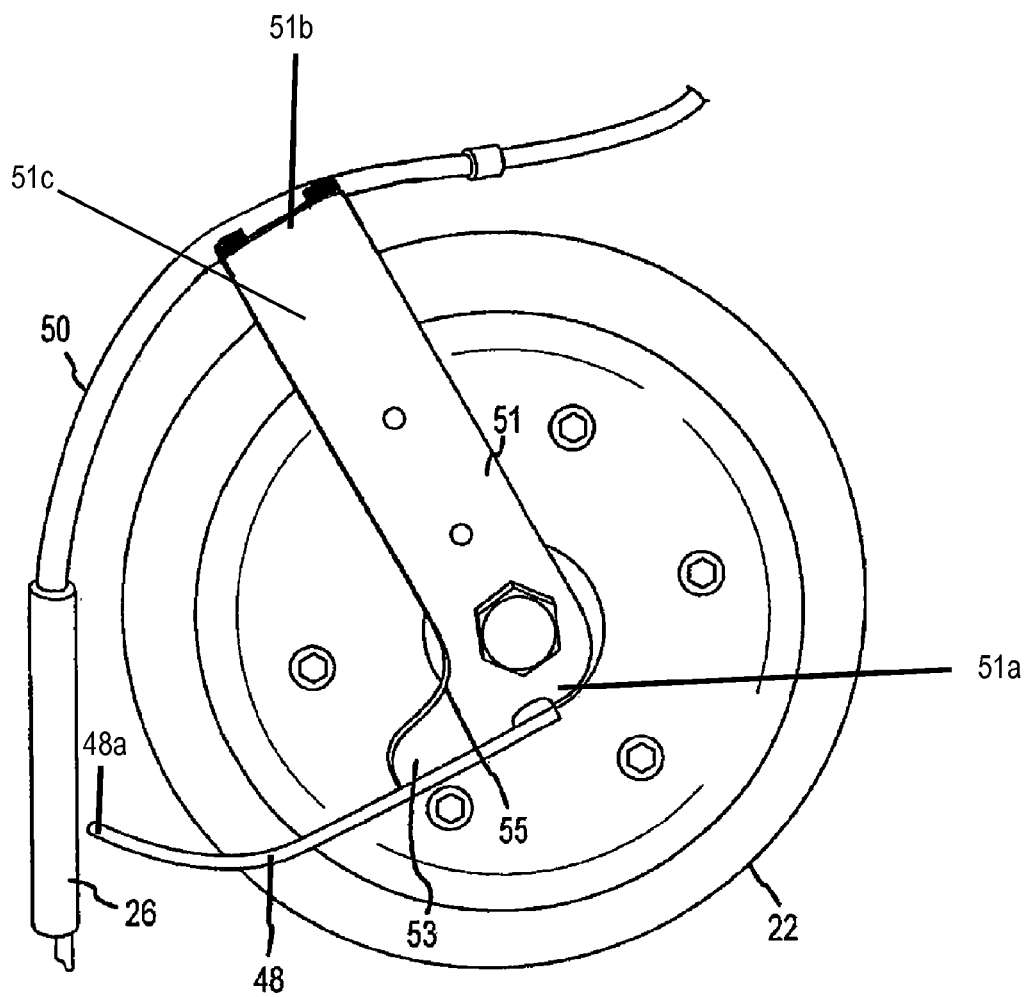
FIG. 5 is a side elevation view of a second embodiment of the trash deflector installed on a disc.

FIG. 5 illustrates another embodiment of the disc attachment bar 51. The disc attachment bar 51 may have a first end 51a and a second end 51b with an outer surface 51c facing away from the disc 22 and an inner surface on the opposite side of the outer surface 51c, which faces the disc 22. As shown in this example, the disc attachment bar 51 extends upwardly and rearwardly of the disc 22. As illustrated in FIG. 5, the fertilizer distributor bar 50 is attached on the second end 51b. The fertilizer distributor bar 50 extends rearwardly from the disc attachment bar 51 such that the fertilizer distributor bar 50 positionable in line with and behind the disc 22. The deflector bar 48 extends rearwardly, with an end 48a positioned lower than the fertilizer distributor bar 50. The deflector bar 48 extends along beside the disc 22 rearwardly. In this embodiment, the disc attachment bar 51 may have a substantially rectangular body that transitions into a boot-shaped bottom portion. The front end or toe 53 of the boot may face towards the fertilizer distributor bar 50 and/or the tube 26. The toe 53 curves at a transition point 55 into the main body of the disc attachment bar 51. In this embodiment, the deflector bar 48 may run underneath a portion of the bottom surface of the toe 53, and the deflector bar 48 may be attached to the disc attachment bar 51 along the bottom surface of the boot-shape. In this embodiment, the deflector bar 48 may receive structural support and/or alignment support as the deflector bar 48 traces a portion of the disc attachment bar 51. Also, although illustrated as separately attached, the deflector bar 48 may be integrally formed with the disc attachment bar 51, and the boot may extend outwards past the disc 22 and form the deflector bar 48.

Figure 6:
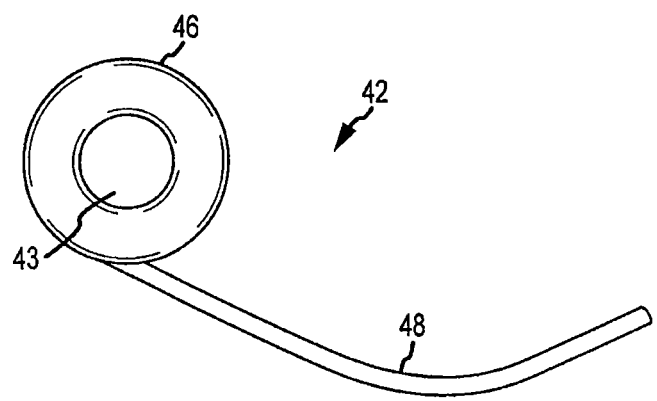
FIG. 6 is a side elevation view of a third embodiment of the trash deflector.
Figure 7:
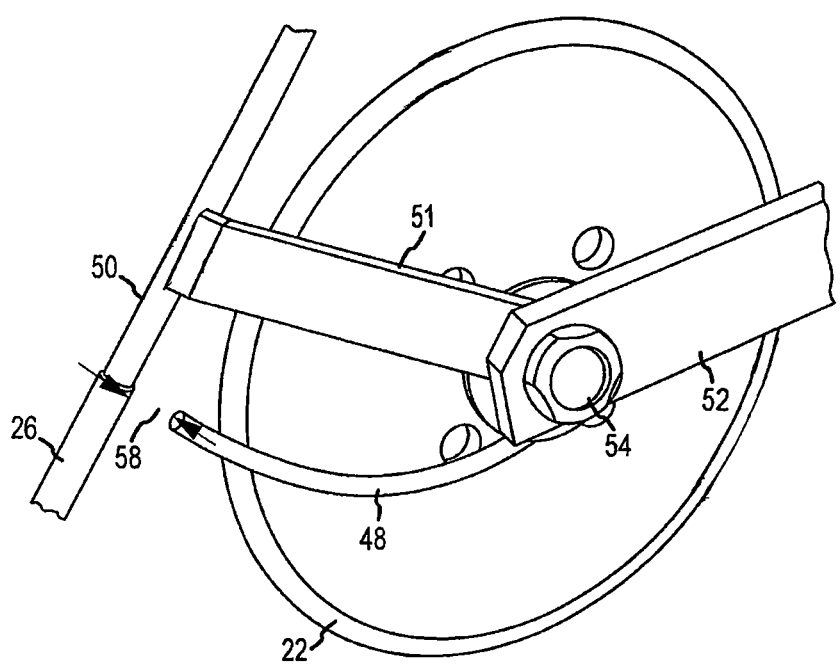
FIG. 7 is a front right perspective view of the trash deflector illustrated in FIG. 6 installed on a disc.

FIGS. 6 and 7 illustrate another embodiment of the trash deflector 42. In this embodiment, the trash deflector 42 includes a retainer 46 and the deflector bar 48. The retainer 46 may include an aperture 43 passing therethrough. In some embodiments, the deflector bar 48 may be welded to the retainer 46. However, it should noted that the deflector bar 48 may be attached to the retainer 46 by many other methods. For example, in other embodiments the deflector bar 48 and the retainer 46 may be integrally formed, i.e. made (from molding and/or other techniques) into a single assembly piece. The retainer 46 may then be used to attach the trash deflector 42 to the disc 22 via the aperture 43, for example, a bolt, screw, etc. may be threaded through the aperture 43 and tightened, securing the retainer 46 to the disc.

Referring now to FIG. 7, the retainer 46 is installed on the disc 22 via a center fastener 54. The retainer 46 may be placed between the disc 22 and the planter bar 52. The retainer 46 helps to secure the center fastener 54 to the disc 22. In some embodiments, the retainer 46 is a washer or other similar device including an aperture. The center fastener 54 may be thread through the aperture 43 and tightened, securing the disc 22 to the planter bar 52 and the retainer 46 to the disc 22. In these embodiments, the disc attachment bar 51 may be connected (for example through welding, etc.) to the planter bar 52 or may be bolted together with the trash deflector 42 to the planter bar 52 or other attachment point of the planter.

As discussed above with respect to the embodiments illustrated in FIGS. 3-4, the deflector bar 48 in some embodiments may actually contact the disc 22 in order to scrape or deflect debris off of the disc 22. In other embodiments, the deflector bar 48 may not actually contact the disc 22, but may be a close enough distance to the disc 22 such that it can shear debris off of the disc 22. These embodiments also allow the deflector 42 to be individually customized to the particular planter and/or the desires of the farmer.

Figure 8:
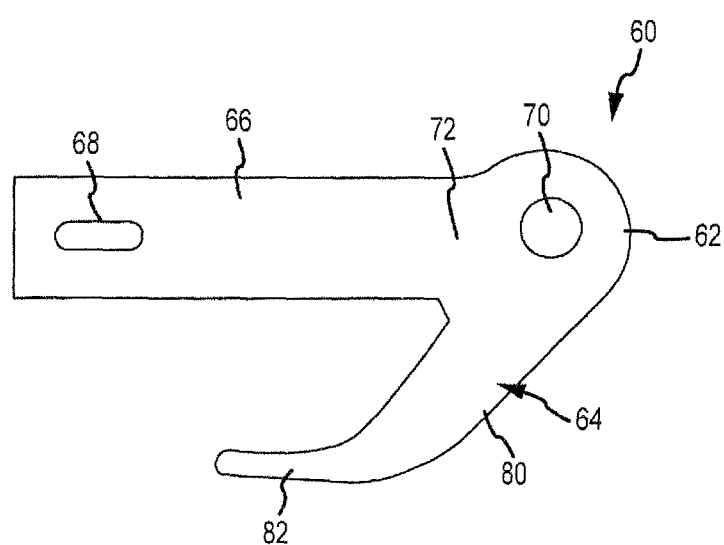
FIG. 8 is a side elevation view of a fourth embodiment of the trash deflector.
Figure 9:
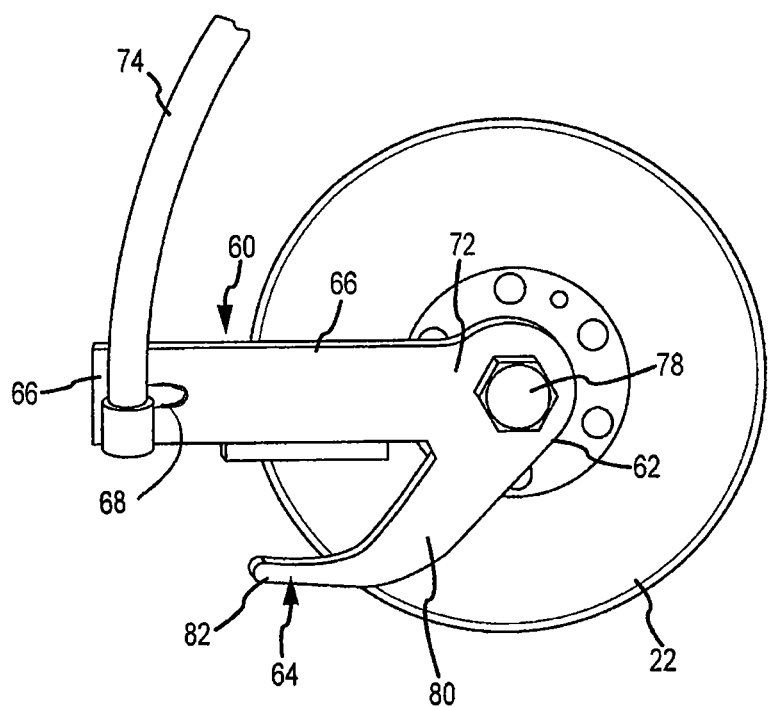
FIG. 9 is a side elevation view of the trash deflector illustrated in FIG. 8 installed on a disc.

FIGS. 8 and 9 illustrate another embodiment of the trash deflector. In this embodiment, the trash deflector may include a deflector bar 64 having a body 80 with a larger width than the embodiment illustrated in FIG. 6, and the body 80 may taper to a point 82. The deflector bar 64 may curve upwards as it transitions into the point 82 and may be slightly horned-shaped. This embodiment may provide additional strength to the deflector bar 64 against debris moving along the periphery of the disc 22 and the deflector bar 64 may be better able to scrape/shear large and/or heavy debris from the disc 22. At the same time, the thickness of the deflector bar 64 may be such that adjustment of the lateral position of the deflector bar is still possible.

Additionally, a support bar 66 may be connected to the deflector bar 64 and the support bar 66 and the deflector bar 64 may connected at a connection washer 62. In some embodiments, the support bar 66, the deflector bar 64 and the connection washer 62 may be integrated together, i.e., formed as a single construction. However, in other embodiments, the elements may be separately formed and joined together via welding, glue, fasteners, or the like. Further, the support bar 66 may be integrally formed with the deflector bar 64.

The support bar 66 may be substantially horizontal and extend outwards from the disc 22 when attached to the disc 22 (see e.g., FIG. 9). A support bar aperture 68 may be located near a terminal end of the support bar 66. The support bar aperture 68 may be adapted to receive a fastening mechanism to secure a fertilizing tube 74, planting tube, or any other device. In other embodiments, the aperture 68 may be arranged and oriented to directly receive the fertilizing tube 74. The support bar 66 may allow for mounting the fertilizer tube 74 (or other assembly) on and away from the outer surface of the disc 22.

The connection washer 62 may be substantially circularly shaped and define a receiving aperture 70 within its center. The receiving aperture 70 receives a fastener 78, connecting the deflector bar 64 and the support bar 66 to the disc 22.

Figure 10:
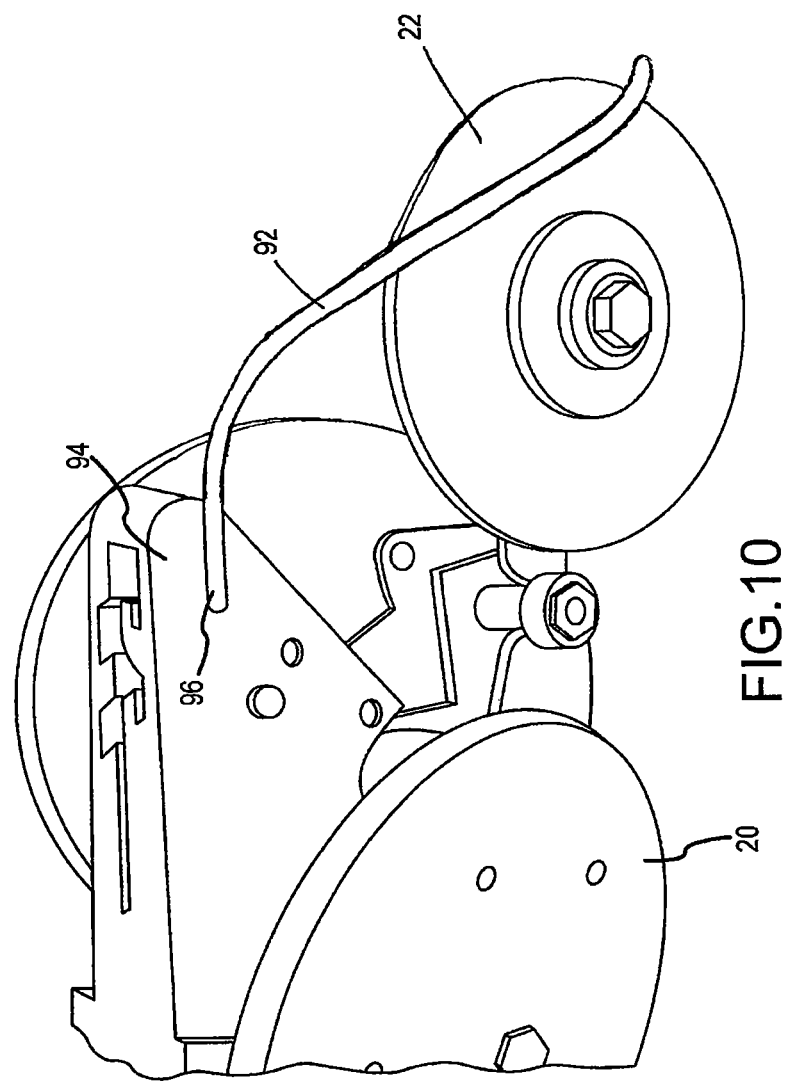
FIG. 10 is an isometric view of a fifth embodiment of the trash deflector.

FIG. 10 illustrates another embodiment of the trash deflector. In this embodiment, the deflector bar 92 may be attached to a tow assembly 92 connected between two wheels 20. The tow assembly 92 may be a seed hopper, fertilizer tank, wheel axel or any other device located near or operably connected to the wheels 20. The deflector bar 92 in this embodiment, may then curve downwards, and be mounted substantially over the top portion of the disc 22. It should be noted that the deflector bar 92 may be mounted on any portion of the planter 12 or other mobile device, as long as the deflector bar 92 is positioned so as to deflect trash and debris from the disc 22 and/or wheels 20. This embodiment may be used in replace of or in addition to the disc mounted deflector bars (e.g., the embodiments illustrated in FIGS. 3-9).

Figure 12:
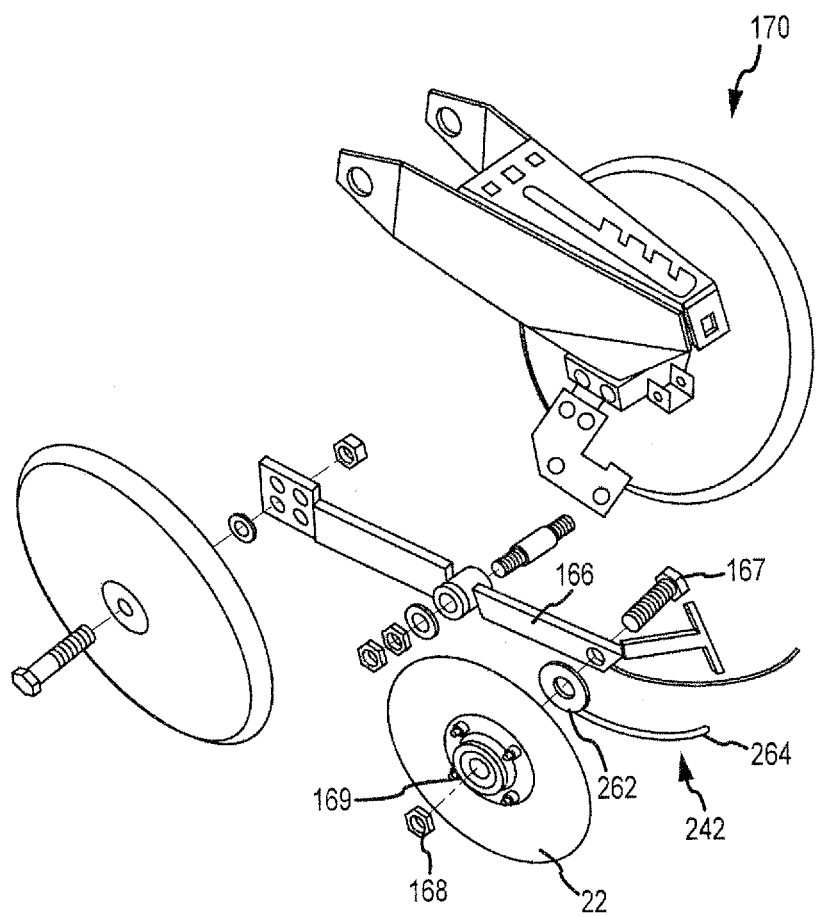
FIG. 12 illustrates an exploded perspective view of a sixth embodiment of a trash deflector.

FIG. 12 illustrates another embodiment of a trash deflector 242. In this embodiment, the deflector 242 may include a washer portion 262 and a deflector bar portion 264. As shown in FIG. 12, in this embodiment, the washer portion 262 and the deflector bar portion 264 may be formed as a single construction, and may be separate from the support bar 166. Additionally, the trash deflector 242 may be positioned between the support bar 166 and the disc 22, and the trash deflector 242, support bar 166, and the disc 22 may be joined together by a nut 168 and a bolt 167 that extends through the washer portion 262 of the deflector 242, and respective apertures 169, 170 defined by the support bar 166 and the disc 22.

Figure 13:
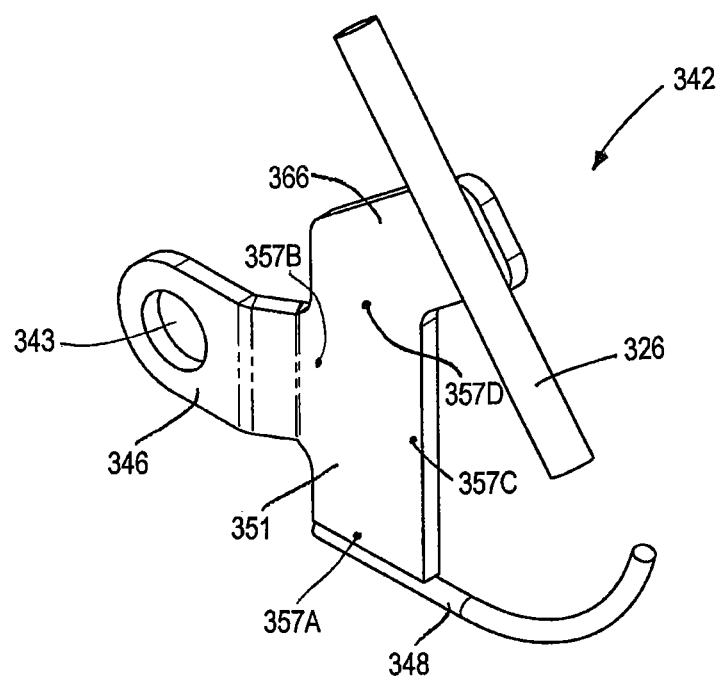
FIG. 13 is an isometric view of a sixth embodiment of the trash deflector.

FIG. 13 illustrates yet another embodiment of a trash deflector 342. The trash deflector may include an attachment assembly 355, a deflector bar 348, and a fertilizer distributor tube 326. The trash deflector 342 may be mounted to along side a wheel or disc and may be configured to remove or limit the accumulation of trash or debris on the wheel or disc.

The attachment assembly 355 may include a main body 351, an attachment tab 346, and a fertilizer extension tab 366. The main body 351 may include a generally planar element having a bottom edge 357A, a front edge 357B, a back edge 357C, and a top edge 357D. The main body 351 may include a inboard face that is substantially flat for general alignment with an associated wheel or disc 22 to maintain clearance from the wheel or disc 22.

The trash deflector bar 348 may be arranged along the bottom edge 357A of the main body 351. The bar 348 may be welded, fastened, or otherwise secured to the main body 351 and may extend rearwardly from the main body 351 in general alignment with the bottom edge 357A. Like the embodiment of FIG. 5, the bar 348 may be secured along the bottom edge 357A and the bottom edge 357A may help to reinforce, stiffen, and provide a secure position and orientation for the bar 348. The trash deflector bar 348 may extend from the main body 351 and turn upward as it extends rearwardly. As such, the deflector bar 348 may be feathered slightly as it engages debris clinging to the associated wheel or disc such that abrupt contact with the debris may be avoided and impact forces on the bar 348 may be controlled. As with other embodiments, the trash deflector bar 348 may be bent or directed slightly inward and may be bendably adjustable laterally so as to be closer or farther from the associated wheel or disc 22.

The attachment tab 346 may extend from the front edge 357B of the main body 351 and may be directed in a laterally inward direction and may then change direction back to being substantially parallel with the main body. The attachment tab 346 may be generally planar and may include an aperture 343 extending therethrough. The aperture may be adapted to receive a fastener such as a bolt, pin, rod, screw, or other fastener for securing the trash deflector 342. The offsetting shape of the attachment tab 346 may allow the trash deflector to be attached adjacent a wheel or disc 22 while allowing the main body 351 and extension tab 366 to remain clear of the wheel or disc 22. In some embodiments, the amount of lateral offset provided by the attachment tab 346 may be selected such that the fertilizer tube is centered on the wheel or disc 22 when positioned adjacent the extension tab 366.

The extension tab 366 may extend upwardly and rearwardly from the top edge 357D of the main body 351. The extension tab may be generally planar and may provide an inboard attachment surface for the fertilizer tube 326. An outermost edge of the extension tab 366 may be generally tangential to a circle that is slightly larger than the wheel or disc. That is, the outermost edge may be substantially perpendicular to the radius of the wheel or disc 22.

The fertilizer tube 236 may be secured to the attachment surface of extension tab 366 and may be aligned with the outermost edge. In some embodiments, the extension tab 366 may deflect slightly inward toward the disc or wheel 22 such that the fertilizer tube may align with the centerline of the wheel or disc 22. While not shown, a fertilizer line may be attached to the fertilizer tube 326 to deliver fertilizer to a position behind and in alignment with the wheel or disc 22. In some embodiments, the attachment may be such that fertilizer flows through the fertilizer tube 326 and the attachment of the fertilizer line may be to an end of the fertilizer tube. In other embodiments, the fertilizer line may extend along the side of the fertilizer tube 326 and the line may be secured adjacent to the fertilizer tube 326. In these embodiments, the fertilizer tube 326 may be a solid bar, plate, or other non-fluid communicating structure. In some embodiments, the fertilizer tube 326 may be welded, bolted, screwed, or otherwise fastened to the extension tab 366.

While the main body 351, attachment tab 346, and extension tab 366 have been described as an integral piece with the deflector bar 348 and fertilizer tube 326 attached thereto, any and/or all of these parts or sub-parts may be provided separately or integrally by molding, machining, or otherwise fabricating out of a single piece of material.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. A deflector for use with a mobile agricultural tool, comprising:
   a disc attachment bar having a first end and a second end and an outer surface opposite an inner surface, with an aperture extending therethrough proximal to the first end, with the aperture configured to attach the disc attachment bar to a disc of the mobile agricultural tool having a portion of the disc attachment bar that includes the second end positioned upwardly and rearwardly relative to the mobile agricultural tool;
   a deflector bar operatively attached to the disc attachment bar, which locates the deflector bar relative to the aperture; and
   a fertilizer bar operatively attached to the disc attachment bar at the second end, wherein the disc attachment bar positions the deflector bar relative to the fertilizer bar and relative to the inner surface, wherein at a first location the fertilizer bar and the deflector bar are spaced from each other at a predetermined distance established by the relative positions, wherein the deflector bar extends away from the disc attachment bar in a direction that positions an end of the deflection bar below the fertilizer bar and the fertilizer bar extends from the disc attachment bar such that when the disc attachment bar is attached to the disc of the mobile agricultural tool the fertilizer bar lines up with the disc rearwardly allowing fertilizer to be deposited directly behind the disc and the deflection bar aligns with the side of the disc.

2. The deflector of claim 1, wherein the disc attachment bar comprises a bolt aperture configured to receive a bolt for securing the disc attachment bar to the disc.

3. The deflector of claim 1, wherein the deflector bar is stainless steel.

4. The deflector of claim 1, wherein the deflector bar is welded to the disc attachment bar at the first end.

5. The deflector of claim 1, wherein the deflector bar is integrally formed with the disc attachment bar.

6. The deflector of claim 1, wherein the deflector bar is configured to substantially prevent debris from traveling along the disc towards the disc attachment bar, past the first location.

7. The deflector of claim 1, wherein the fertilizer bar comprises a fertilizer tube configured to deposit fertilizer in a furrow behind the disc.

8. The deflector of claim 1, wherein the deflector bar is oil tempered wire.

9. The deflector of claim 1, wherein the deflector bar is operatively attached to a bottom portion of the disc attachment bar.

10. The deflector of claim 1, wherein the disc attachment bar is operatively attached to the disc at a center point of the disc.

11. The deflector of claim 10, wherein the fertilizer bar is directly connected to the second end of the disc attachment bar.

12. The deflector of claim 11, wherein the deflector bar is directly connected to the first end of the disc attachment bar.

13. The deflector of claim 12, further comprising a fertilizer tube operatively attached to one end of the fertilizer bar, the fertilizer tube configured to deposit fluids within a furrow created by the disc.

14. The deflector of claim 13, wherein the deflector bar extends from the first end of the disc attachment bar towards the fertilizer tube.

* * * * *